(12) United States Patent
Akaishi

(10) Patent No.: US 10,582,109 B2
(45) Date of Patent: *Mar. 3, 2020

(54) CONTROL APPARATUS AND METHOD OF CONTROLLING

(71) Applicant: CANON KABUSHIKI KAISHA, Tokyo (JP)

(72) Inventor: Masao Akaishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,015

(22) Filed: Nov. 9, 2017

(65) Prior Publication Data

US 2018/0070002 A1 Mar. 8, 2018

Related U.S. Application Data

(63) Continuation of application No. 14/201,580, filed on Mar. 7, 2014, now Pat. No. 9,826,136.

(30) Foreign Application Priority Data

Mar. 27, 2013 (JP) ................................. 2013-067129

(51) Int. Cl.
*H04N 5/232* (2006.01)
(52) U.S. Cl.
CPC ......... *H04N 5/23206* (2013.01); *H04N 5/232* (2013.01)
(58) Field of Classification Search
CPC ....... G09G 2320/068; F16M 11/02–18; G08B 13/1963; G08B 13/19689; H04N 5/2259; H04N 5/23216; H04N 5/232; H04N 5/23203; H04N 5/23206
See application file for complete search history.

(56) References Cited

U.S. PATENT DOCUMENTS

| 6,768,563 B1 | 7/2004 | Murata et al. |
| 6,769,131 B1 | 7/2004 | Tanaka et al. |
| 7,113,971 B1 | 9/2006 | Ohi et al. |

(Continued)

FOREIGN PATENT DOCUMENTS

| CN | 1784004 A | 7/2006 |
| CN | 100456808 C | 1/2009 |

(Continued)

OTHER PUBLICATIONS

Chinese Office Action dated Oct. 9, 2016, issued in corresponding Chinese Patent Application No. 201410116529.X.

(Continued)

*Primary Examiner* — Christopher K Peterson
(74) *Attorney, Agent, or Firm* — Venable LLP

(57) ABSTRACT

A control apparatus controls an image capturing unit for which an image capturing direction is movable inputs at least one of a setting value for restricting a movable range for which the image capturing direction of an image capturing unit is movable, or a setting value for restricting a visible range for which displaying is permitted in a range capturable by moving the image capturing direction of the image capturing unit and controls one of the movable range or the visible range based on a setting value for restricting the other of the movable range and the visible range.

15 Claims, 12 Drawing Sheets

(56) References Cited

U.S. PATENT DOCUMENTS

| | | |
|---|---|---|
| 7,663,666 B2 | 2/2010 | Kawai et al. |
| 7,956,891 B2 | 6/2011 | Uchihara |
| 9,344,630 B2 | 5/2016 | Hamada et al. |
| 9,826,136 B2 * | 11/2017 | Akaishi .................. H04N 5/232 |
| 2001/0045983 A1 | 11/2001 | Okazaki et al. |
| 2005/0007459 A1 * | 1/2005 | Kawai .................... H04N 5/232 |
| | | 348/211.99 |
| 2006/0139484 A1 | 6/2006 | Seo et al. |
| 2009/0015670 A1 | 1/2009 | Gopinath et al. |
| 2010/0328460 A1 | 12/2010 | Merkel et al. |
| 2012/0293654 A1 | 11/2012 | Ikegami |

FOREIGN PATENT DOCUMENTS

| | | | |
|---|---|---|---|
| CN | 101803384 A | 8/2010 |
| CN | 101933027 A | 12/2010 |
| CN | 102387304 A | 3/2012 |
| CN | 102694976 A | 9/2012 |
| JP | 2001-016559 A | 1/2001 |
| JP | 2001-268423 A | 9/2001 |
| JP | 2004-343498 A | 12/2004 |

OTHER PUBLICATIONS

Nov. 5, 2019 Office Action in Chinese Patent Application No. 201810207438.5 (with English translation).

* cited by examiner

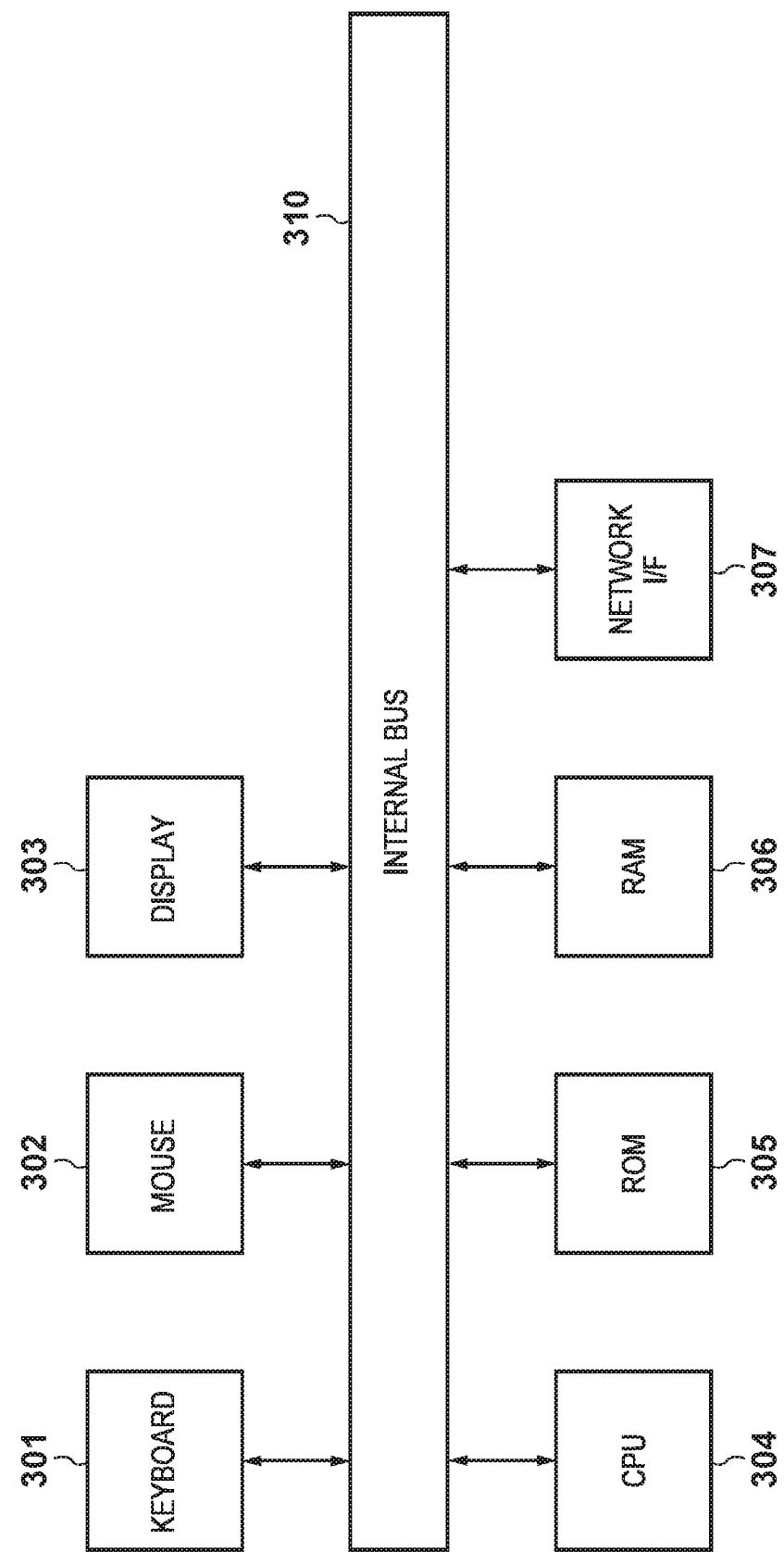

CONTROL APPARATUS AND METHOD OF CONTROLLING

BACKGROUND OF THE INVENTION

Field of the Invention

The present invention relates to a control apparatus operable to control an image capturing unit for which an image capturing direction is movable, and to a method of controlling.

Description of the Related Art

In recent years, network cameras for video monitoring where a camera is controlled by remote operation via a network or a dedicated line are known. Network cameras have multiple functions, and there are those equipped with an electrically zoomable lens, and those having mechanisms for panning (horizontal orientation rotation) and tilting (vertical orientation rotation) which can move an image capturing direction.

Also, network cameras having functions for visible range restrictions so that when a capturable angle of view range is set, outside of the angle of view range that is set is not captured due to pan/tilt control, and functions for movable range restrictions which set a pan/tilt controllable range exist.

Network cameras having both functions for visible range restrictions and movable range restrictions must control pan/tilt operations so that contradictions do not arise between the restrictions.

For example, in Japanese Patent Laid-Open No. 2004-343498, a technique is disclosed in which in cases where the operation of a camera is controlled, when operation is restricted by usage-prohibited range setting set within an operation range of the camera, operation for avoiding the usage-prohibited range is performed, and the operation of the camera is executed based on instructions of an instruction unit.

However, in the conventional technique disclosed in Japanese Patent Laid-Open No. 2004-343498, visible range restrictions so that outside of the angle of view range that is set is not captured, and movable range restrictions that set the pan/tilt controllable range cannot co-exist.

SUMMARY OF THE INVENTION

An aspect of the present invention is to eliminate the above-mentioned problems which are found in the conventional technology.

A feature of the present invention is to provide a technique in which movable range restrictions and visible range restrictions are controlled appropriately without contradiction.

According to an aspect of the present invention, there is provided by a control apparatus operable to control an image capturing unit for which an image capturing direction is movable, the control apparatus comprising: an input unit configured to input at least one of a first setting value for restricting a movable range for which the image capturing direction of the image capturing unit is movable, or a second setting value for restricting a visible range for which displaying is permitted in a range capturable by moving the image capturing direction of the image capturing unit; and a control unit configured to control one of the movable range or the visible range based on a setting value for restricting the other of the movable range and the visible range.

According to an aspect of the present invention, there is provided by a method of controlling an image capturing unit operable to move an image capturing direction, the method comprising: inputting at least one of a first setting value for restricting a movable range for which the image capturing direction of an image capturing unit is movable, or a second setting value for restricting a movable range for which displaying is permitted in a range capturable by moving the image capturing direction of the image capturing unit; and controlling one of the movable range or the visible range based on a setting value for restricting the other of the movable range and the visible range.

Further features of the present invention will become apparent from the following description of exemplary embodiments with reference to the attached drawings.

BRIEF DESCRIPTION OF THE DRAWINGS

FIG. 3 is a block diagram for showing a configuration of a control apparatus of some embodiments.

FIG. 7A-1 is a flowchart for showing software control executed by a CPU of the controlling apparatus of the second embodiment.

FIG. 7A-2 is a flowchart for showing software control executed by a CPU of the controlling apparatus of the second embodiment.

DESCRIPTION OF THE EMBODIMENTS

Detailed explanation will be given for embodiments of the present invention using the drawings below.

First Embodiment

Figure 1:
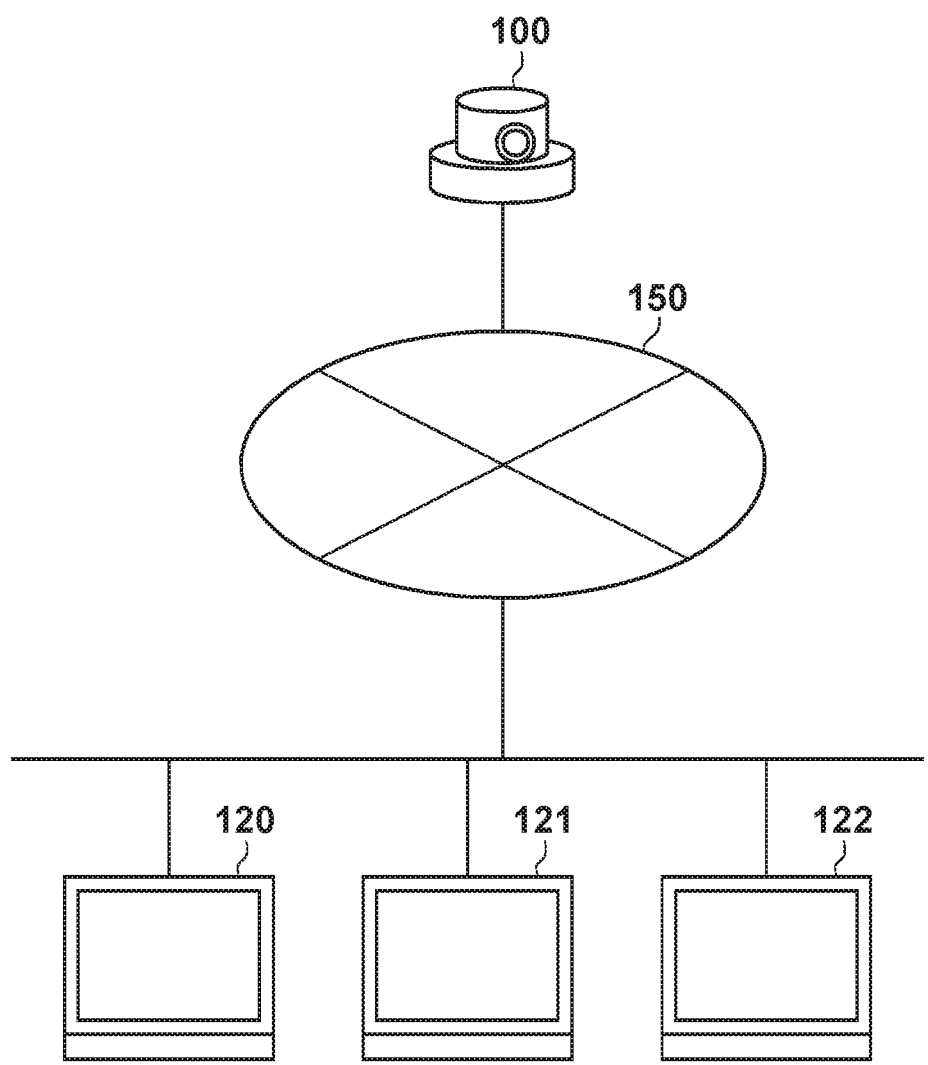
FIG. 1 is a system configuration diagram of some embodiments.

FIG. 1 is a system configuration diagram for a system comprising a network camera and a client. This system configuration is a configuration that is common to first, second and third embodiments. A network camera 100, which is an image capturing apparatus, and which functions as a camera server, and controlling apparatuses 120-122 which function as clients (external apparatuses/information processing apparatuses) are connected to each other via a network 150. The controlling apparatuses 120-122 include programs which performing camera control using a communication protocol for camera control.

Figure 2:
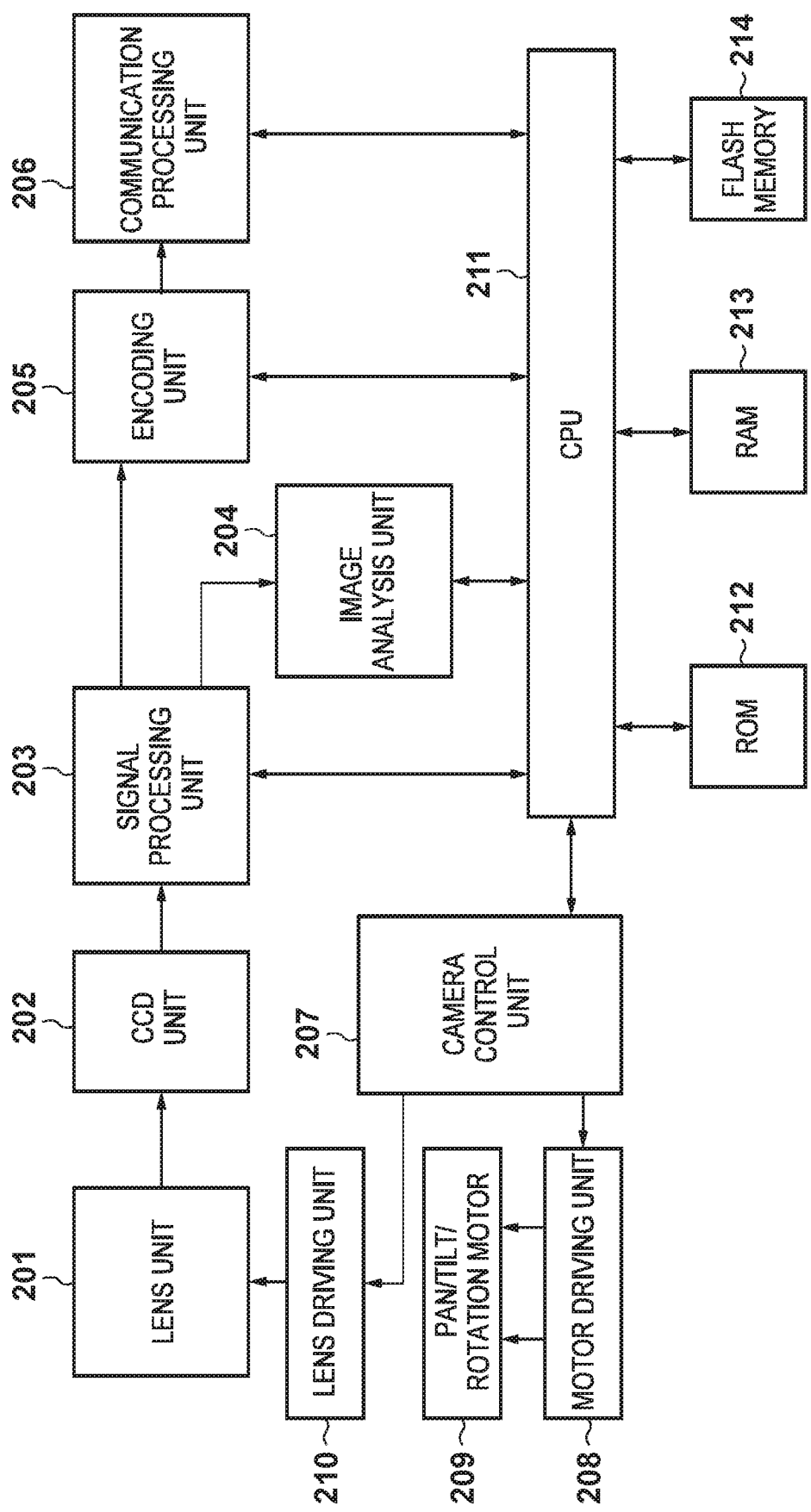
FIG. 2 is a block diagram for showing a configuration of a network camera of some embodiments.

FIG. 2 is a block diagram for showing an overall configuration of the network camera 100. This overall configuration is a configuration that is common to the first, second and third embodiments.

In FIG. 2, 201 denotes a lens unit, 202 denotes a CCD unit, 203 denotes a signal processing unit, 204 denotes an image analysis unit, 205 denotes an encoding unit, and 206 denotes a communication processing unit.

Below explanation will be given for processing up until image data captured by the network camera 100 is delivered to the network 150.

An optical image captured by the lens unit 201 is transmitted to the signal processing unit 203 after being converted into RGB digital data by the CCD unit 202. In the signal processing unit 203 processing for converting the RGB digital data into YCbCr4:2:0 format or YCbCr4:2:2 format digital data (image data), conversion processing for converting to a requested transmission-image image size, and various filter processing is performed. Processed image data is transmitted simultaneously to the encoding unit 205 when transmitted to the image analysis unit 204. In the encoding unit 205, encoding compression processing for encoding the image data into a predetermined format such as an H.264 format or a JPEG format, for example, is executed.

H.264 moving image stream data or JPEG still image data generated by the encoding unit 205 is delivered (communication) via the network 150, in accordance with a network protocol such as TCP/IP, HTTP or RTP, to the controlling apparatuses 120-122 by the communication processing unit 206. In the image analysis unit 204, processing is performed for detecting whether or not a target object or image pattern for specified conditions is included in the image by analyzing the captured image data. Each of the processing blocks of the signal processing unit 203, the image analysis unit 204, the encoding unit 205, and the communication processing unit 206 is connected to the CPU 211.

207 denotes a camera control unit which is connected to a motor driving unit 208 and a lens driving unit 210. The camera control unit 207 outputs control signals for pan/tilt/rotation operations of the camera (movement in a pan direction or a tilt direction, and rotation centered around an optical axis) control signals for operations such as zoom and AF (auto-focus) in accordance with instructions from the CPU 211. Also, the camera control unit 207 controls at least one of a visible range setting or a movable range setting of the network camera 100 in accordance with at least one of a visible range or a movable range stored in the RAM 213.

The motor driving unit 208 is equipped with a motor driving electric circuit, or the like, and changing the image capturing direction of the camera by the rotation of the motor by driving of a pan/tilt/rotation motor 209 in accordance with control signals from the camera control unit 207 is possible.

The lens driving unit 210 is equipped with a motor and a motor driving electric circuit for controlling zoom, AF, and the like, and is controlled in accordance with control signals from the camera control unit 207.

211 denotes a CPU (Central Processing Unit), which controls the operation of the apparatus in general by executing control programs stored in a ROM (Read Only Memory) 212. To the CPU 211 are connected the ROM 212, a RAM (Random Access Memory) 213, and a flash memory 214. Also, the CPU 211 is connected to the signal processing unit 203, the image analysis unit 204, the encoding unit 205 and the communication processing unit 206, and the CPU 211 controls each of the processing blocks by executing initiation/stopping of operation, setting of operation conditions, acquisition of operation results, and the like for each of the processing blocks. Detailed explanation will be given for operation of the CPU 211 with the later described flowcharts.

In the ROM 212 programs and data for the CPU 211 to control the apparatus such as application processing are stored. The RAM 213 is a memory for which data is written/read upon execution by the CPU 211 of the programs in the ROM 212. The RAM 213 is provided with a work area, a temporary save area, or the like, which is used for program execution by the CPU 211 in apparatus control. The RAM 213 stores at least one of a visible range setting for specifying a capturable angle of view range, or a movable range setting for specifying a movable range in a pan direction, in a tilt direction and in a zoom direction. Note, the present invention is not limited to a network camera capable of controlling pan/tilt/zoom mechanisms, and can be adopted to network cameras capable of controlling pan and tilt.

FIG. 3 is a block diagram for showing an overall configuration of the controlling apparatuses 120-122. This overall configuration is a configuration that is common to the first, second and third embodiments.

In the controlling apparatuses 120-122, which are information processing apparatuses, a keyboard 301, a mouse 302, a display 303, a CPU 304, a ROM 305, a RAM 306 and a network I/F 307 are connected to each other via an internal bus 310. In the controlling apparatuses 120-122, the CPU 304, the ROM 305 and the RAM 306 operate in coordination, and under the control of the CPU 304, various processing is executed using the programs stored in the ROM 305, and various data stored in the RAM 306.

The keyboard 301 and the mouse 302 are input apparatuses that provide various instructions to the control apparatus. The display 303 is an output apparatus for performing display and is, for example, a liquid crystal display device.

Figure 4A:
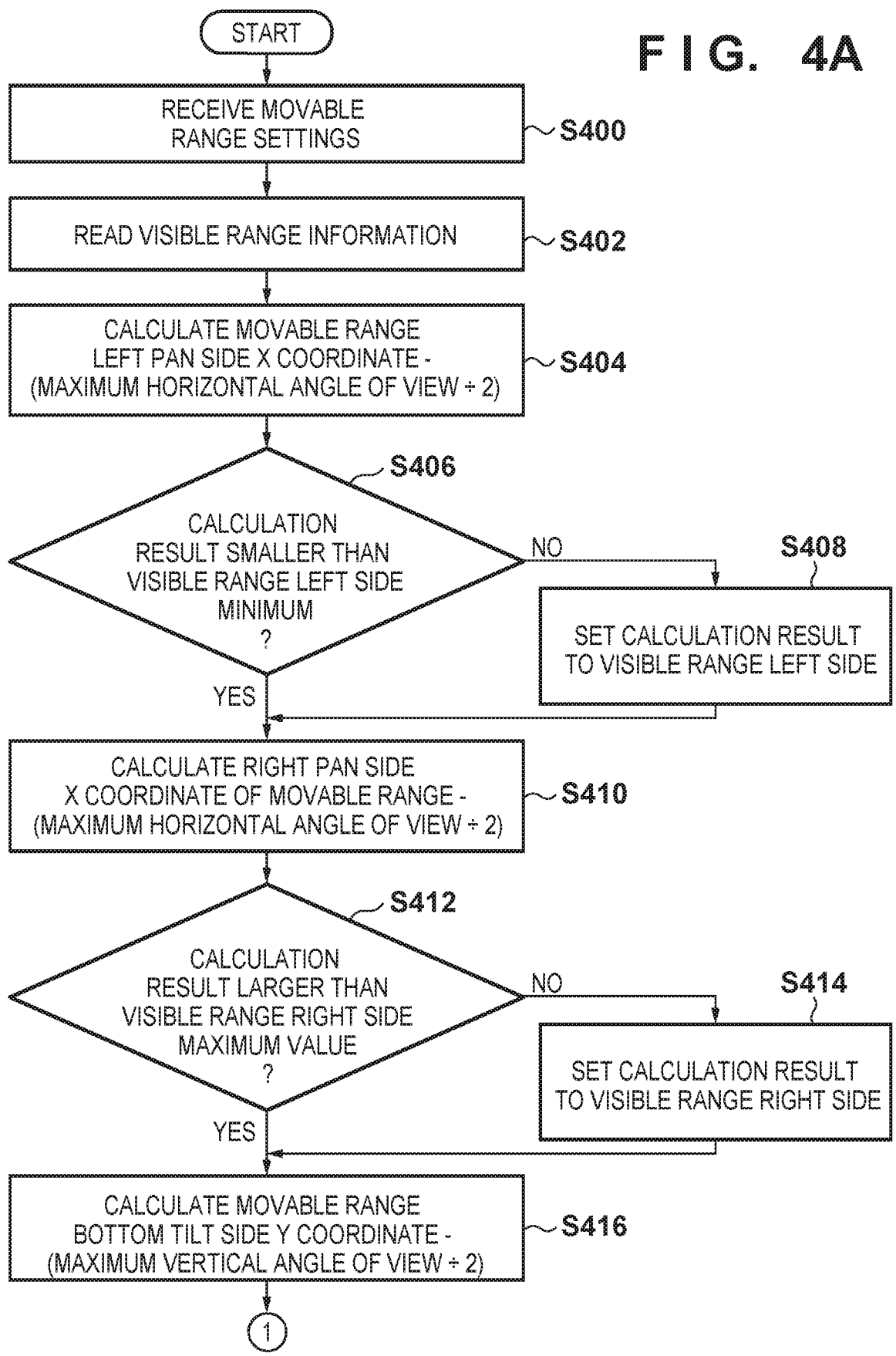
FIGS. 4A and 4B are flowcharts for showing software control executed by a CPU of the network camera of a first embodiment.
Figure 4B:
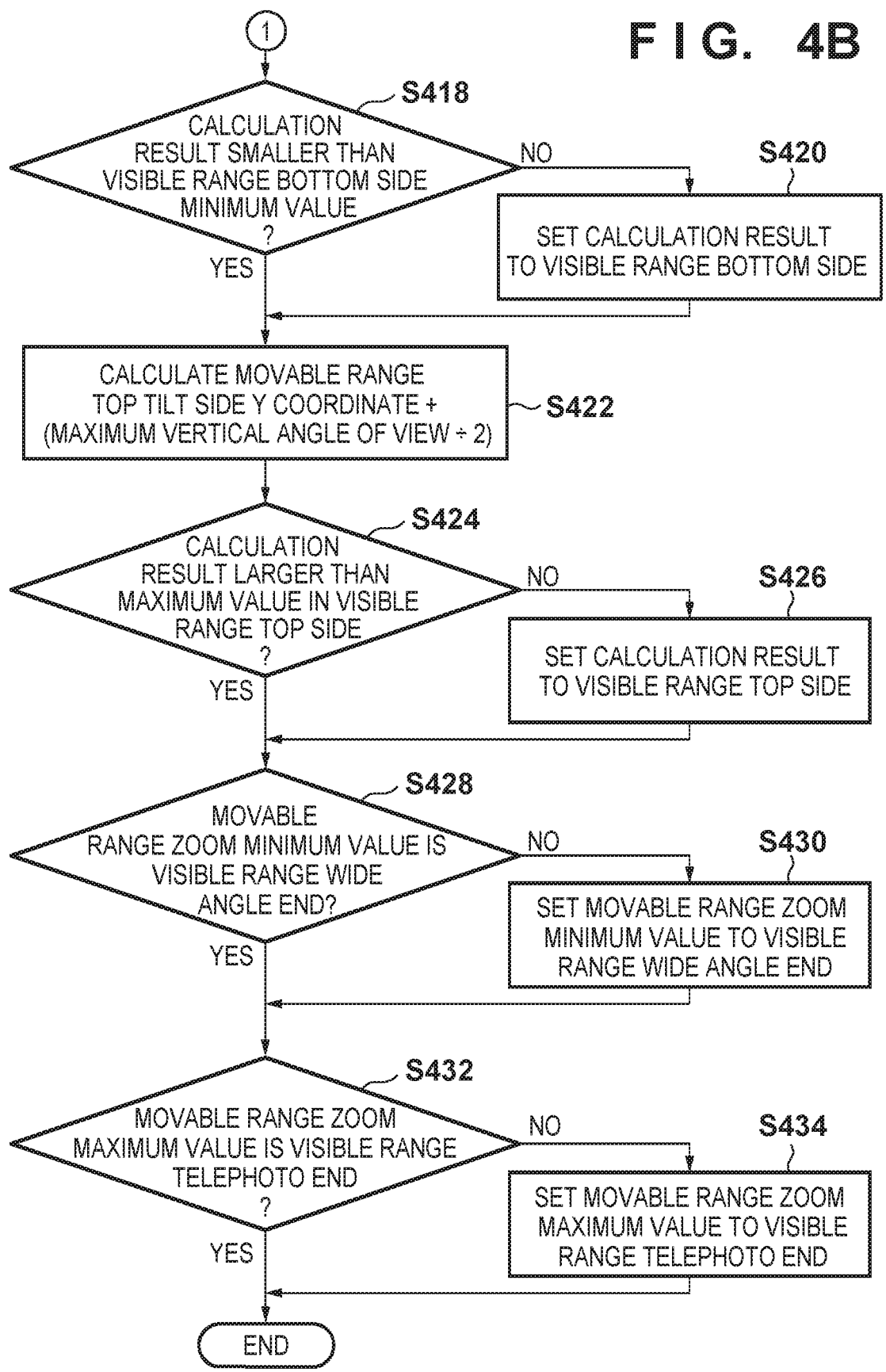

FIGS. 4A and 4B are flowcharts for showing software control executed by the CPU 211 of the network camera 100 of a first embodiment. In this embodiment, visible range settings are calculated from movable range settings.

Note, an ONVIF (Open Network Video Interface Forum) protocol used in the first embodiment is a protocol that an organization with an object of establishing global open standards of network video product interfaces settled upon.

In FIGS. 4A and 4B, upon initiation of the processing, two parameters: PanTiltLimits (pan/tilt movable range) and ZoomLimits (zooming movable range) are transmitted based on a setConfiguration command, which is defined in a PTZ service of the ONVIF protocol, from the controlling apparatus 120.

In step S400, the CPU 211, via the communication processing unit 206, receives parameters as movable range settings in accordance with these commands (movable range setting commands), and saves them to the RAM 213. The movable range settings are ranges in which a pan direction and a tilt direction can change. Also, a range in which a zoom scaling factor can change may be included in the movable range settings.

Note, the movable range settings are made to be movable range settings corresponding to a wide-angle end of the network camera 100. However, the movable range settings may be made to be corresponding to a telephoto end of the network camera 100 or the movable range settings may be made to be corresponding to the wide-angle end and a telephoto end in accordance with intended use. Also, the movable range settings are setting values specified by a user with the controlling apparatus 120.

In step S402, the CPU 211 reads visible range information stored in the flash memory 214 into the RAM 213. Here, the visible range information is information of a range of settable values for the visible range (settable range). Specifically, the visible range information is, for example, coordinate information (maximum values and minimum values) of a top side, a bottom side, a left side and a right side of the visible range of the network camera 100 and the wide-angle end and telephoto end of the visible range for a zoom function. Here, the visible range is a range in XY coordinates when a horizontal orientation is made to be the X axis and a vertical orientation is made to be the Y axis for a basis position (a center axis of an optical system in an image capturing direction, for example) of the network camera 100. Also, the telephoto end is a limit value for when a zoom operation (movable) is performed in a telephoto direction using an optical zoom, or an optical zoom and an electronic zoom, as the zoom function of the network camera 100.

In step S404, the CPU 211 calculates (an X coordinate of a left pan side of the movable range−(a maximum horizontal angle of view of the network camera÷2)), and saves the calculation result into the RAM 213. The X coordinate of the left pan side of the movable range is the X coordinate for when the image capturing direction of the camera is made to face leftmost in the movable range. The X coordinate on the left side of the capturable range when the image capturing direction of the camera is made to face in the direction for the left pan side is the X coordinate of the left pan side of the movable range−(the maximum horizontal angle of view of the network camera÷2).

In step S406, the CPU 211 compares the calculation result of step S404 with the minimum value of the left side of the visible range. In a case where the result of the comparison is that the calculation result of step S404 is greater than or equal to the minimum value of the left side of the visible range (NO in step S404), the CPU 211, in step S408, saves the calculation result of step S404 into the flash memory 214 as the setting value of the left side of the visible range. In other words, in a case where the left side of the capturable range when the image capturing direction of the camera is made to face in the direction for the left pan side of the movable range is more to the right side than the left side of the visible range, the left side of the capturable range when the image capturing direction of the camera is made to face in the direction for the left pan side of the movable range is set to the left side of the visible range.

On the other hand, in cases where the calculation result of step S404 is less than the minimum value of the left side of the visible range (YES in step S406), the value of the left side of the visible range set in the flash memory 214 is not changed. In cases where the value of the left side of the visible range is not set, namely in cases where the left side of the visible range in the flash memory 214 is empty, it is left empty.

Next, in step S410, the CPU 211 calculates (the X coordinate of the right pan side of the movable range+(the maximum horizontal angle of view of the network camera÷2)), and saves the calculation result into the RAM 213. The X coordinate of the right pan side of the movable range is the X coordinate for when the image capturing direction of the camera is made to face rightmost in the movable range. The X coordinate on the right side of the capturable range when the image capturing direction of the camera is made to face in the direction for the right pan side is the X coordinate of the right pan side of the movable range+(the maximum horizontal angle of view of the network camera÷2).

In step S412, the CPU 211 compares the calculation result of step S410 with the maximum value of the right side of the visible range. In a case where the result of the comparison is that the calculation result of step S410 is less than or equal to the maximum value of the right side of the visible range (NO in step S412), the CPU 211, in step S414, saves the calculation result of step S410 into the flash memory 214 as the setting value of the right side of the visible range. In other words, in cases where the right side of the capturable range when the image capturing direction of the camera is made to face in the direction for the right pan side of the movable range is more to the left side than the right side of the visible range, the right side of the capturable range when the image capturing direction of the camera is made to face in the direction for the right pan side of the movable range is set to the right side of the visible range.

On the other hand, in cases where the calculation result of step S410 is larger than the maximum value of the right side of the visible range (YES in step S412), the value of the right side of the visible range set in the flash memory 214 is not changed.

Next, in step S416, the CPU 211 calculates (the Y coordinate of the bottom tilt side of the movable range−(the maximum vertical angle of view of the network camera÷2)), and saves the calculation result into the RAM 213. The Y coordinate of the bottom tilt side of the movable range is the Y coordinate for when the image capturing direction of the camera is made to face bottommost in the movable range. The Y coordinate on the bottom side of the capturable range when the image capturing direction of the camera is made to face in the direction for the bottom tilt side is the Y coordinate of the bottom tilt side of the movable range−(the maximum vertical angle of view of the network camera÷2).

In step S418, the CPU 211 compares the calculation result of step S416 with the minimum value of the bottom side of the visible range. In a case where the result of the comparison is that the calculation result of step S416 is greater than or equal to the minimum value of the bottom side of the visible range (NO in step S418), the CPU 211, in step S420, saves the calculation result of step S416 into the flash memory 214 as the setting value of the bottom side of the visible range. In other words, in a case where the bottom side of the capturable range when the image capturing direction of the camera is made to face in the direction for the bottom tilt side of the movable range is more to the top side than the bottom side of the visible range, the bottom side of the capturable range when the image capturing direction of the camera is made to face in the direction for the bottom tilt side of the movable range is set to the bottom side of the visible range.

On the other hand, in cases where the calculation result of step S416 is less than the minimum value of the bottom side of the visible range (YES in step S418), the value of the bottom side of the visible range set in the flash memory 214 is not changed.

Next, in step S422, the CPU 211 calculates (the Y coordinate of the top tilt side of the movable range+(the maximum vertical angle of view of the network camera÷2)), and saves the calculation result into the RAM 213. The Y coordinate of the top tilt side of the movable range is the Y coordinate for when the image capturing direction of the camera is made to face topmost in the movable range. The Y coordinate on the top side of the capturable range when the image capturing direction of the camera is made to face in the direction for the top tilt side is the Y coordinate of the top tilt side of the movable range+(the maximum vertical angle of view of the network camera÷2).

In step S424, the CPU 211 compares the calculation result of step S422 with the maximum value of the top side of the visible range. In a case where the result of the comparison is that the calculation result of step S422 is less than or equal to the maximum value of the top side of the visible range (NO in step S424), the CPU 211, in step S426, saves the calculation result of step S422 into the flash memory 214 as the setting value of the top side of the visible range. In other words, in a case where the top side of the capturable range when the image capturing direction of the camera is made to face in the direction for the top tilt side of the movable range is more to the bottom side than the top side of the visible range, the top side of the capturable range when the image capturing direction of the camera is made to face in the direction for the top tilt side of the movable range is set to the top side of the visible range.

On the other hand, in cases where the calculation result of step S422 is larger than the maximum value of the top side of the visible range (YES in step S424), the value of the top side of the visible range set in the flash memory 214 is not changed.

Next, in step S428, the CPU 211 determines whether or not the minimum value for zooming of the movable range stored in step S400 is the wide-angle end of the network camera 100. The value of the wide-angle end is stored in the ROM 212, for example. In a case where the result of the determination is that the minimum value for zooming of the movable range is not the wide-angle end of the network camera 100 (NO in step S428), the CPU 211, in step S430, saves the minimum value for zooming of the movable range into the flash memory 214 as the setting value of the wide-angle end of the visible range.

On the other hand, in cases where the minimum value for zooming of the movable range is the wide-angle end of the network camera 100 (YES in step S428), the value of the wide-angle end of the visible range set in the flash memory 214 is not changed.

Next, in step S432, the CPU 211 determines whether or not the maximum value for zooming of the movable range stored in step S400 is the telephoto end of the network camera 100. The value of the telephoto end is stored in the ROM 212, for example. In a case where the result of the determination is that the maximum value for zooming of the movable range is not the telephoto end of the network camera 100 (NO in step S432), the CPU 211, in step S434, saves the maximum value for zooming of the movable range into the flash memory 214 as the setting value of the telephoto end of the visible range.

On the other hand, in cases where the maximum value for zooming of the movable range is the telephoto end of the network camera 100 (YES in step S432), the value of the telephoto end of the visible range set in the flash memory 214 is not changed.

By the above processing, the network camera 100 can adjust (change) the visible range and the movable range using setting values for the top side, bottom side, left side and right side, as well as the wide-angle end and telephoto end of the visible range in the zoom function stored in the flash memory 214. Because these setting values are values that satisfy both ranges (the visible range and the movable range), it becomes possible to control the operation of the network camera 100 without causing a contradiction to arise in the visible range restrictions and the movable range restrictions.

Here, providing a concrete example, in a case where the minimum value of the left side of the visible range of the visible range information read out in step S402 is −180, for example, and the calculation result of step S404 is −170, because the calculation result is greater than or equal to the minimum value of the left side of the visible range, the calculation result is set for the left side of the visible range in step S408. In other words, in such a case, because of the movable range setting, the left side of the visible range becomes narrower (from −180 to −170).

On the other hand, in cases where the calculation result of step S404 is −190, because the calculation result is less than the minimum value of the left side of the visible range, nothing is done. In other words, in such cases, because the setting value of the left side of the visible range is not changed by the setting of the movable range and rather is left at its initial value "−180", the left side of the visible range does not become narrower due to the setting of the movable range. Note, in cases where the visible range is not set upon initiation of the processing shown in FIGS. 4A and 4B, the setting values of the visible range stored in the flash memory 214 may be made to be empty or setting to "−180" for the processing value of the left side of the visible range, for example, may be made. In cases where the setting values of the visible range stored in the flash memory 214 are made to be empty, the minimum value of the left side of the visible range which is compared with the calculation result in step S406 is "−180" which is set in the ROM 212 beforehand. For similar processing, this is also performed in step S412, step S418 and step S424.

Figure 5:
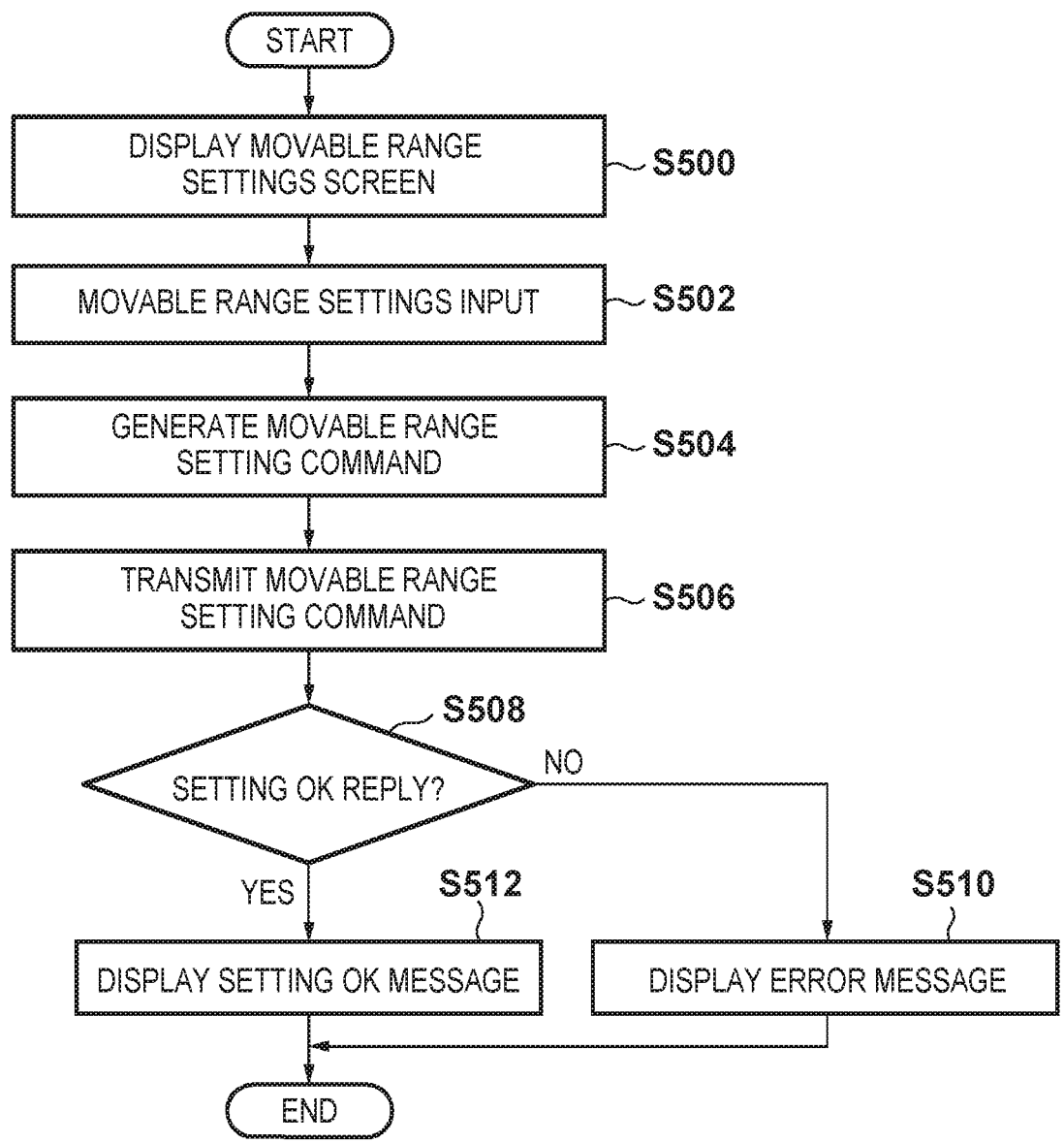
FIG. 5 is a flowchart for showing software control executed by a CPU of the controlling apparatus of the first embodiment.

FIG. 5 is a flowchart for showing software control executed by each CPU 304 of the controlling apparatuses 120-122 of the first embodiment. Note, in FIG. 5, explanation will be given providing an example of a case where the CPU 304 of the controlling apparatus 120 executes, but similar processing is executed by the CPU 304 of the controlling apparatuses 121 and 122.

When the display of a movable range settings screen is requested by input of the keyboard 301 or the mouse 302, the CPU 304, in step S500, displays the movable range settings screen on the display 303. In step S502, when movable range settings are input with the input of the keyboard 301 or the mouse 302, the CPU 304 stores the movable range settings in the RAM 306. In step S504, the CPU 304 generates a movable range setting command of the ONVIF protocol. In step S506, the CPU 304 transmits, via the network I/F 307, the generated movable range command (command transmission).

In step S508, the CPU 304 waits for a reply from the network camera 100, and determines the existence or absence of a setting OK reply. When the network camera 100 completes the setting processing for setting the visible range shown in FIGS. 4A and 4B normally, it transmits a setting OK reply to the controlling apparatus 120. In cases where there is no setting OK reply (NO in step S508), or in cases of a setting NG reply, the CPU 304, in step S510, displays on the display 303 an error message to the effect that the movable range settings could not be set for the network camera 100. On the other hand, in cases of a setting OK reply (YES in step S508), the CPU 304, in step S512, displays to the display 303 a setting OK message to the effect that the movable range settings could be set for the network camera 100.

As explained above, by the first embodiment it becomes possible to control the network camera without contradiction in restrictions even in a case where the network camera is controlled in accordance with setting values for visible range restrictions and the network camera is controlled in accordance with setting values for movable range restrictions. Because of this, the user becomes able to use the two functions simultaneously, and convenience is improved.

Second Embodiment

Note, adjustment between the visible range settings and the movable range settings may be performed on the controlling apparatus side.

Figure 6:
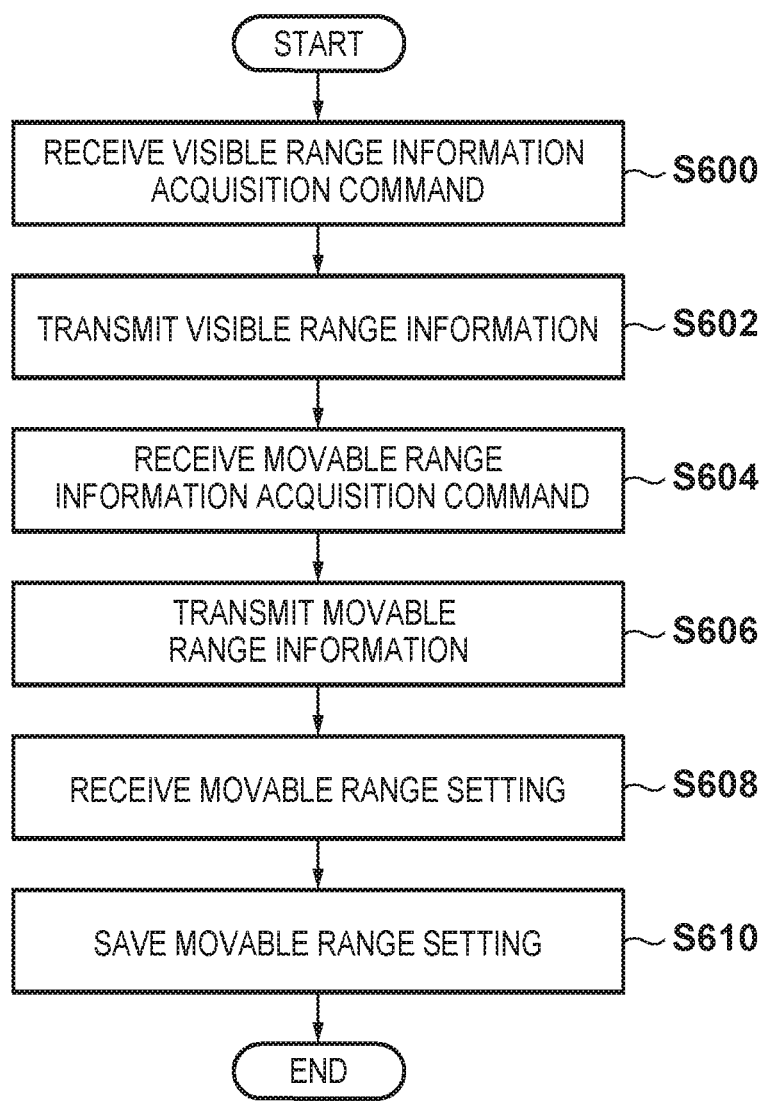
FIG. 6 is a flowchart for showing software control executed by a CPU of the network camera of a second embodiment.

FIG. 6 is a flowchart for showing software control executed by the CPU 211 of the network camera 100 of the second embodiment and which performs adjustment between the visible range settings and the movable range settings on the controlling apparatus side.

In FIG. 6, upon initiation of the processing, a visible range information acquisition command is transmitted from the controlling apparatus 120. In step S600, the CPU 211 receives the visible range information acquisition command via the communication processing unit 206, and having received this acquires the visible range information of the network camera 100 itself. The visible range information is stored in the flash memory 214. Here, the visible range information is coordinate information (maximum values and minimum values) of a top side, a bottom side, a left side and a right side of the visible range of the network camera 100 and the wide-angle end and telephoto end of the visible range for a zoom function.

In step S602, the CPU 211 transmits to the controlling apparatus 120 the acquired visible range information. Note, in cases where any of the setting values (coordinate information) of the visible range is not set for the network camera 100, a null value is sent in notification to the controlling apparatus 120 as the value of the setting value that is not set.

In step S604, the CPU 211 receives a getNode command defined in a PTZ service of the ONVIF protocol from the controlling apparatus 120 as a movable range information acquisition command, and having received this, acquires the movable range information of the network camera 100 itself. The movable range information is stored in the flash memory 214 or the ROM 212. Here, the movable range information is coordinate information (maximum values and minimum values) of a top side, a bottom side, a left side and a right side of the movable range defined by the motor driving unit 208 and the lens driving unit 210 of the network camera 100 and the wide-angle end and telephoto end of the movable range for a zoom function.

In step S606, the CPU 211 sets the acquired movable range information to a getNodeResponse command defined in a PTZ service of the ONVIF protocol and transmits to the controlling apparatus 120. Also, wide-angle end angle of view information of the network camera 100 is acquired and transmitted similarly to the movable range information.

With a setConfiguration command defined in the PTZ service of the ONVIF protocol, two parameters (PanTiltLimits (pan/tilt movable range) and ZoomLimits (zooming movable range)) are transmitted from the controlling apparatus 120. In step S608, the CPU 211 receives the parameters as movable range settings in accordance with the command via the communication processing unit 206, and saves to the RAM 213.

In step S610, the CPU 211 saves the movable range settings stored in the RAM 213 into the flash memory 214.

FIGS. 7A-1 and 7A-2 and FIG. 7B are flowcharts for showing software control executed by the CPU 304 of the controlling apparatuses 120-122 of the second embodiment which performs adjustment between the visible range settings and the movable range settings on the controlling apparatus side. Note, in FIGS. 7A-1, 7A-2 and 7B, explanation will be given providing an example of a case where the CPU 304 of the controlling apparatus 120 executes, but similar processing is executed by the CPU 304 of the controlling apparatuses 121 and 122.

In step S700, the CPU 304 transmits the visible range information acquisition command to the network camera 100 and acquires the visible range information from the network camera 100. Here, the visible range information is coordinate information (maximum values and minimum values) of a top side, a bottom side, a left side and a right side of the visible range of the network camera 100 and the wide-angle end and telephoto end of the visible range for a zoom function.

In step S702, the CPU 304 determines whether or not all of the setting values of the visible range information are already set. In cases where the setting values are already set (YES in step S702), the CPU 304, in step S704, displays a visible range settings set dialogue on the display 303. In cases where any of the setting values of the visible range information is not yet set (NO in step S702), the processing returns to step S700. In cases where any of the setting values of the visible range information is not yet set, adjustment between the visible range settings and the movable range settings is not performed.

Figures 1, 7A:
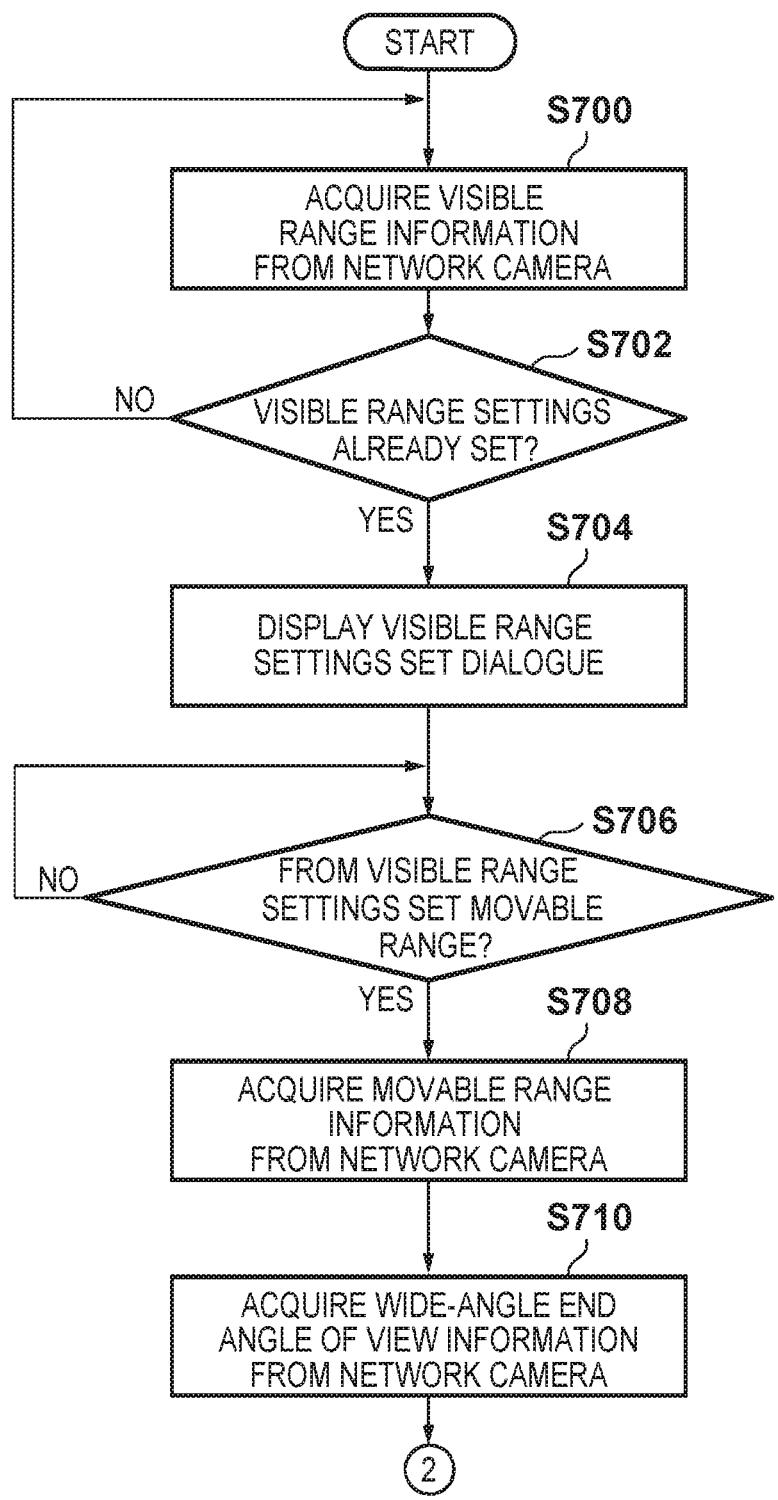
Figures 2, 7A:
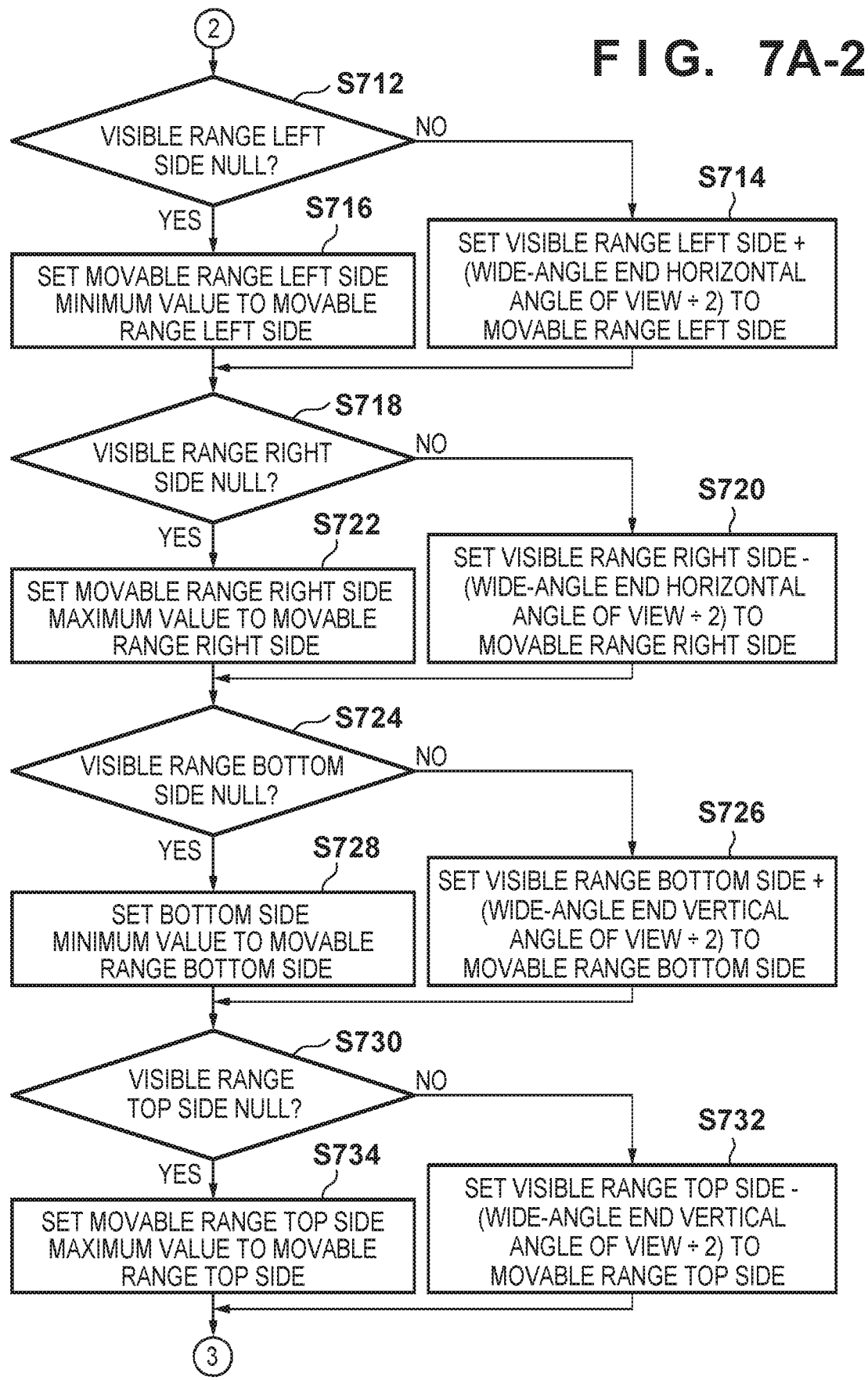
Figure 7B:
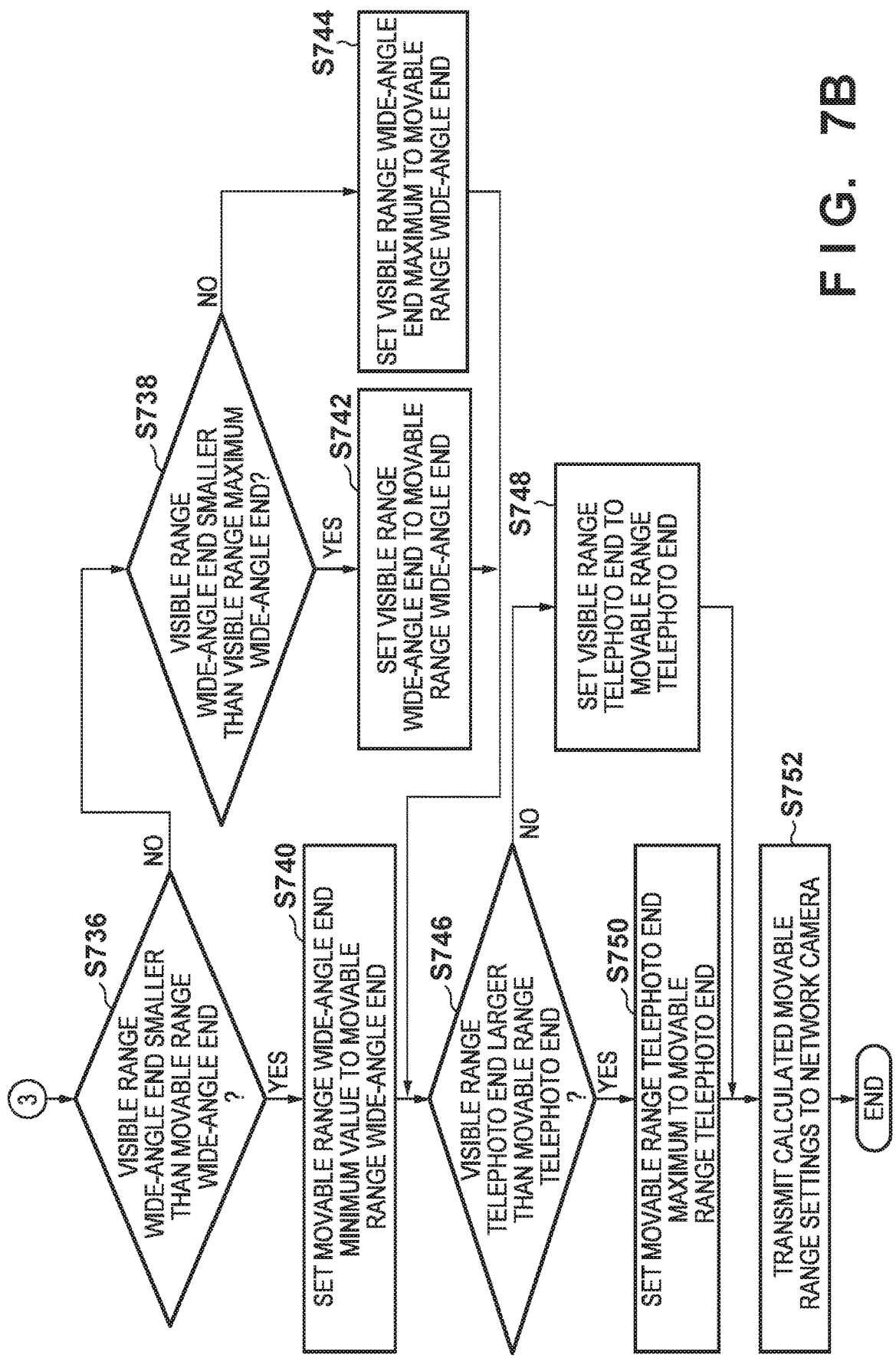
FIG. 7B is a flowchart for showing software control executed by a CPU of the controlling apparatus of the second embodiment.

In step S706, the CPU 304 determines whether or not setting of the movable range performance is selected (instructed) by the user from the setting of the visible range from the alternatives of the visible range settings set dialogue displayed in step S704. In cases where setting has not been selected (NO in step S706), waiting is performed until setting is selected. In cases where setting is not selected within a predetermined time, the processing of FIG. 7 completes.

On the other hand, in cases where setting is selected (YES in step S706), the CPU 304, in step S708, transmits a getNode command defined in the PTZ service of the ONVIF protocol to the network camera 100. Then, the CPU 304 receives a getNodeResponse command defined in the PTZ service of the ONVIF protocol as the reply, and acquires the movable range information set in the getNodeResponse command. Here, the movable range information is coordinate information (maximum values and minimum values) of a top side, a bottom side, a left side and a right side of the movable range defined by the motor driving unit 208 and the lens driving unit 210 of the network camera 100 and the wide-angle end and telephoto end of the movable range for a zoom function.

In step S710, the CPU 304 acquires wide-angle end angle of view information from the network camera 100. Here, the wide-angle end angle of view information is values of horizontal angle of view and vertical angle of view for the wide-angle end of the network camera 100.

In step S712, the CPU 304 determines the value of the left side of the visible range information acquired in step S700 and determines whether or not this value is a null value. In cases where it is not a null value (NO in step S712), the CPU 304, in step S714, calculates the left side of the visible range+(the wide-angle end horizontal angle of view÷2), and sets the calculation result as the value of the left side of the movable range. On the other hand, in cases where it is a null value (YES in step S712), in step S716, the CPU 304 sets the minimum value of the left side of the movable range as the value of the left side of the movable range. The minimum value of the left side of the movable range is acquired from the network camera 100 in step S708.

In step S718, the CPU 304 determines the right side value of the visible range information acquired in step S700, and determines whether or not the value is a null value. In cases where it is not a null value (NO in step S718), the CPU 304, in step S720, calculates the visible range right side−(the wide-angle end horizontal angle of view÷2), and sets the calculation result as the right side value of the movable range. On the other hand, in cases where it is a null value (YES in step S718), the CPU 304, in step S722, sets the maximum value of the right side of the movable range as the right side value of the movable range. The maximum value of the right side of the movable range is acquired from the network camera 100 in step S708.

In step S724, the CPU 304 determines the value of the bottom side of the visible range information acquired in step S700, and determines whether or not that value is a null value. In cases where it is not a null value (NO in step S724), the CPU 304, in step S726, calculates the visible range bottom side+(the wide-angle end vertical angle of view÷2), and sets the calculation result as the value of the bottom side of the movable range. On the other hand, in cases where it is a null value (YES in step S724), the CPU 304, in step S728, sets the minimum value of the bottom side of the movable range as the value of the bottom side of the movable range. The minimum value of the bottom side of the movable range is acquired from the network camera 100 in step S708.

In step S730, the CPU 304 determines the value of the top side of the visible range information acquired in step S700, and determines whether or not that value is a null value. In cases where it is not a null value (NO in step S730), the CPU 304, in step S732, calculates the visible range top side+(the wide-angle end vertical angle of view÷2), and sets the calculation result as the value of the top side of the movable range. On the other hand, in cases where it is a null value (YES in step S730), the CPU 304, in step S734, sets the maximum value of the top side of the movable range as the value of the top side of the movable range. The maximum value of the top side of the movable range is acquired from the network camera 100 in step S708.

In step S736, the CPU 304 determines the value of the wide-angle end of the visible range that the visible range information acquired in step S700 indicates. In cases where the value of the wide-angle end of the visible range is smaller than the wide-angle end of the movable range acquired in step S708 (YES in step S736), the CPU 304, in step S740, sets the minimum value of the wide-angle end of the movable range acquired in step S708 as the value of the wide-angle end of the movable range. In other words, in cases where the value of the wide-angle end of the visible range is smaller than the wide-angle end of the movable range, the wide-angle end of the movable range is restricted to the minimum value of the wide-angle end of the movable range acquired in step S708.

On the other hand, in cases where the value of the wide-angle end of the visible range is greater than or equal to the wide-angle end of the movable range (NO in step S736), the CPU 304, in step S738, determines whether or not the value of the wide-angle end of the visible range is less than the maximum wide-angle end in the visible range. In cases where the value of the wide-angle end of the visible range is less than the maximum wide-angle end in the visible range (YES in step S738), the CPU 304, in step S742, sets the wide-angle end of the visible range acquired in step S700 as the wide-angle end of the movable range. On the other hand, in cases where the value of the wide-angle end of the visible range is greater than or equal to the maximum wide-angle end in the visible range (NO in step S738), the CPU 304, in step S744, sets the maximum wide-angle end in the visible range acquired in step S700 as the wide-angle end of the movable range.

In step S746, the CPU 304 determines the value of the telephoto end of the visible range that the visible range information acquired in step S700 indicates. In cases where the value of the telephoto end of the visible range is larger than the telephoto end of the movable range acquired in step S708 (YES in step S746), the CPU 304, in step S750, sets the maximum value of the telephoto end of the movable range acquired in step S708 as the value of the telephoto end of the movable range. On the other hand, in cases where the value of the telephoto end of the visible range is less than or equal to the telephoto end of the movable range (NO in step S746), the CPU 304, in step S748, sets the value of the telephoto end of the visible range as the telephoto end of the movable range. In other words, in cases where the value of the telephoto end of the visible range is less than or equal to the telephoto end of the movable range, the telephoto end of the movable range is restricted to the telephoto end of the visible range.

In step S752, the CPU 304 sets each setting value of the movable range calculated in step S750 to parameters of PanTiltLimits (pan/tilt movable range) and ZoomLimits (zooming movable range) of a setConfiguration command defined in the PTZ service of the ONVIF protocol, and transmits this to the network camera 100 as movable range setting values.

As explained above, by the second embodiment, a similar effect to that of the first embodiment can be obtained in the controlling apparatus side as well.

Third Embodiment

Figure 8A:
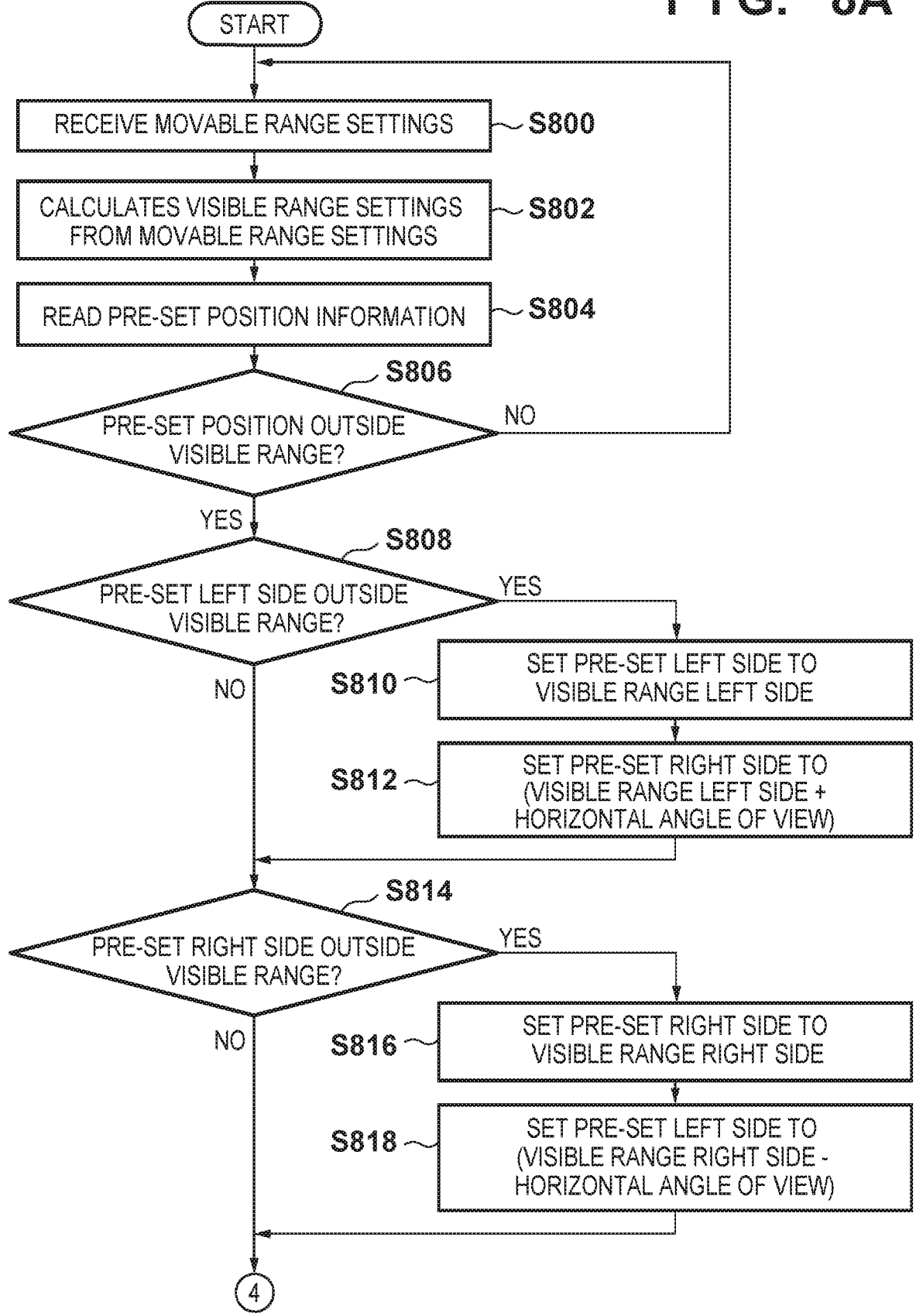
FIGS. 8A and 8B are flowcharts for showing software control executed by a CPU of the network camera of a third embodiment.
Figure 8B:
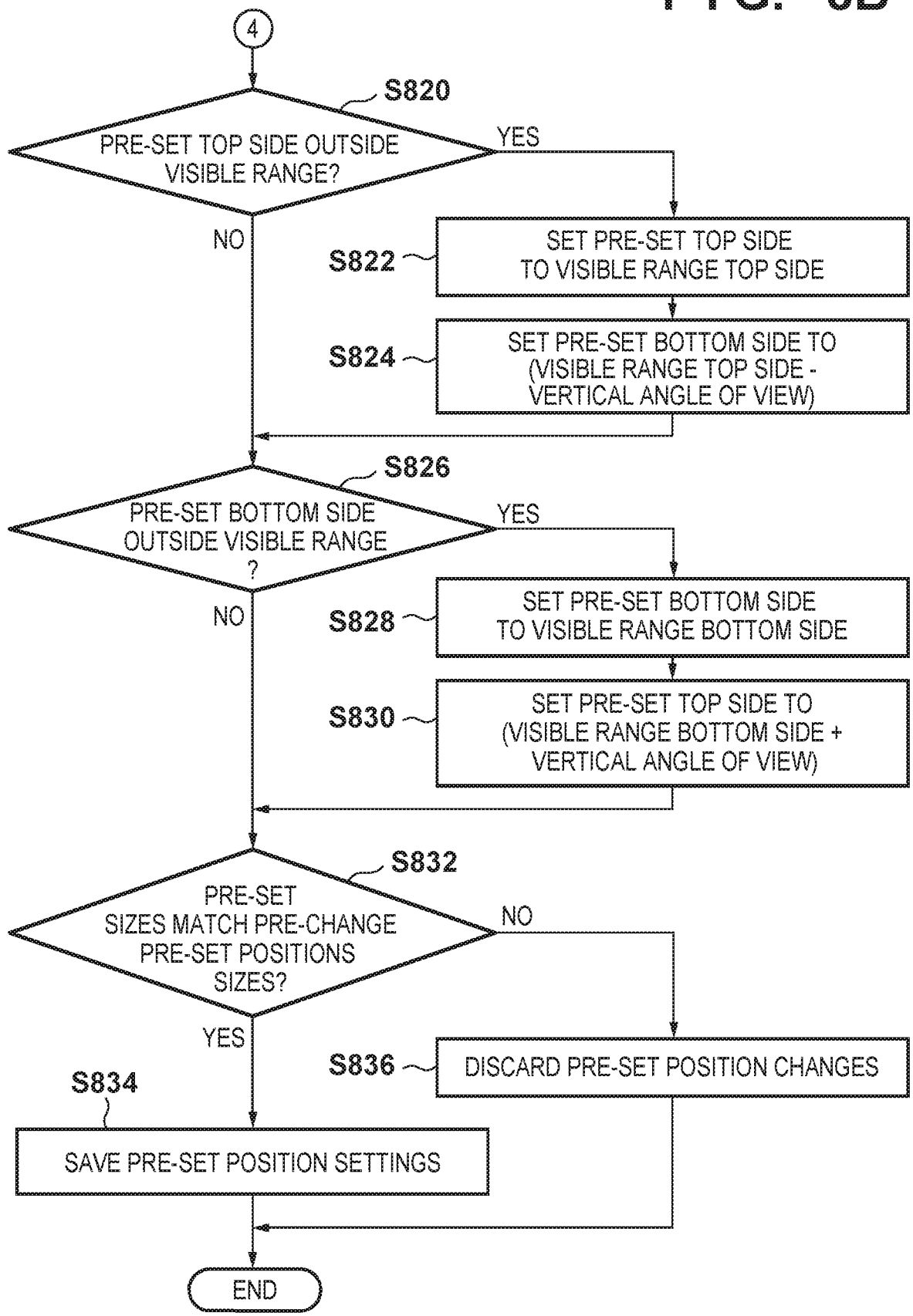

FIGS. 8A and 8B are flowcharts for showing software control executed by the CPU 211 of the network camera 100 of a third embodiment.

In FIGS. 8A and 8B, upon initiation of the processing, two parameters: PanTiltLimits (pan/tilt movable range) and ZoomLimits (zooming movable range) are transmitted based on a setConfiguration command, which is defined in a PTZ service of the ONVIF protocol, from the controlling apparatus 120. In step S800, the CPU 211 receives the parameters as movable range settings in accordance with the command via the communication processing unit 206, and saves to the RAM 213.

In step S802, the CPU 211 calculates the visible range settings from the movable range settings. This processing is similar to step S402-step S434 in FIGS. 4A and 4B. Accordingly, in step S802, as in FIGS. 4A and 4B, the visible range is set based on the movable range.

In step S804, the CPU 211 reads pre-set position information from the flash memory 214 of the network camera 100.

In step S806, the CPU 211 determines whether or not a pre-set position (a pre-set value) that the pre-set position information read out in step S804 indicates is outside of the visible range read out in step S802. The pre-set position has an X coordinate value and a Y coordinate value, and in step S806 it is determined whether the X coordinate value and the Y coordinate value of the pre-set position are outside the visible range. In cases where they are not outside of the visible range (NO in step S806), the processing returns to step S800. Alternatively, the processing may proceed to step S808, continuing from step S804 without performing the determination as to whether they are outside of the visible range.

Meanwhile, in cases where they are outside of the visible range (YES in step S806), the CPU 211, in step S808, determines whether or not the left side of the pre-set position read out in step S804 is outside of the visible range (to the outside of the left side of the visible range) read out in step S802.

In cases where they are outside of the visible range (YES in step S808), the CPU 211, in step S810, sets the left side of the pre-set position so that the left side of the pre-set position becomes the left side of the visible range. Next, in step S812, the CPU 211 calculates (the left side of the visible range+the horizontal angle of view of the pre-set position) and sets the right side of the pre-set position so that the right side of the pre-set position becomes the calculation result.

In step S814, the CPU 211 determines whether or not the right side of the pre-set position read out in step S804 is outside of the visible range read out in step S802 (to the outside of the right side of the visible range).

In cases where it is outside of the visible range (YES in step S814), the CPU 211, in step S816, sets the right side of the pre-set position so that the right side of the pre-set position becomes the visible range right side. Next, in step S818, the CPU 211 calculates (the visible range right side−the horizontal angle of view of the pre-set position), and sets the left side of the pre-set position so that the left side of the pre-set position becomes the calculation result.

Next, in step S820, the CPU 211 determines whether or not the top side of the pre-set position read out in step S804 is outside of the visible range read out in step S802 (to the outside of the top side of the visible range).

In cases where it is outside of the visible range (YES in step S820), the CPU 211, in step S822, sets the top side of the pre-set position so that the top side of the pre-set position becomes the top side of the visible range. Next, in step S824, the CPU 211 calculates (the visible range top side−the vertical angle of view of the pre-set position), and sets the bottom side of the pre-set position so that the bottom side of the pre-set position becomes the calculation result.

Next, in step S826, the CPU 211 determines whether or not the bottom side of the pre-set position read out in step S804 is outside of the visible range read out in step S802 (to the outside of the bottom side of the visible range).

In cases where it is outside of the visible range (YES in step S826), the CPU 211, in step S828, sets the bottom side of the pre-set position so that the bottom side of the pre-set position becomes the bottom side of the visible range. Next, in step S830, the CPU 211 calculates (the visible range bottom side−the vertical angle of view of the pre-set position), and sets the top side of the pre-set position so that the top side of the pre-set position becomes the calculation result.

In step S832, the CPU 211 compares the sizes defined for each pre-set side set in step S810-step S830 with the sizes defined for each pre-set side read out in step S804. In cases where they are matching (YES in step S832), the CPU 211, in step S834, saves the pre-set settings set in step S810-step S830 into the flash memory 214, and transmits a setting success notification to the controlling apparatus 120.

On the other hand, in cases where they are not matching (NO in step S832), the CPU 211, in step S836, discards the pre-set settings set in step S810-step S830, and transmits a setting failure notification to the controlling apparatus 120.

Note, operations in the controlling apparatus 120-121 can be realized in accordance with FIG. 5 of the first embodiment. For example, the controlling apparatus 120 displays a setting OK message when notified of setting success by the network camera 100 (step S512), and displays an error message when notified of setting failure (step S510).

As explained above, by the third embodiment the calculation of setting values of the visible range from setting values of the movable range becomes possible by setting a value of the visible range calculated from the movable range for the wide-angle end to the visible range. For this reason, because the necessity of worrying about the setting value of the other side, when the user sets a setting of one side, is removed, the load on the user is reduced.

Note, in the third embodiment, configuration is taken such that the setting values of the visible range are calculated from the setting values of the movable range, but configuration may be taken such that the setting values of the movable range are calculated from the setting values of the visible range.

The present invention is valid in cases where a network camera is controlled, and in particular can be applied to a network camera having pan/tilt (and zoom) mechanisms and capable of moving the angle of view for capturing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-067129, filed Mar. 27, 2013, which is hereby incorporated by reference herein in its entirety.

What is claimed is:

1. An image capturing apparatus connected to a network, the image capturing apparatus comprising:
   one or more central processing units; and
   one or more memories storing instructions to be executed by the one or more central processing units, wherein, when read and executed by the one or more central processing units, the instructions cause the image capturing apparatus to function as:
      an image capturing unit capable of changing a capturing region in a pan direction and a tilt direction and capable of changing a size of an angle of view;
      a control unit configured to control, based on visible range restriction information, the capturing region and the size of the angle of view of the image capturing unit so that the image capturing unit does not capture outside of a region defined by the visible range restriction information, wherein the visible range restriction information defines the region using an edge of the angle of view as a criterion;

a receiving unit configured to receive, from an external device, a movable range setting command indicating movable range restriction information defining a movable range of the pan direction and the tilt direction of the image capturing unit, wherein the movable range restriction information defines the movable range using a center of the angle of view as a criterion; and a determination unit configured to determine, in a case where the receiving unit receives the movable range setting command, visible range restriction information from the movable range restriction information indicated by the movable range setting command received by the receiving unit and a maximum angle of view of the image capturing unit, wherein the control unit controls, in the case where the receiving unit receives the movable range setting command, based on the visible range restriction information determined by the determination unit, the capturing region and the size of the angle of view of the image capturing unit.

2. The image capturing apparatus according to claim 1, wherein the determination unit determines the visible range restriction information based on edges in the pan direction of the movable range restriction information and a maximum horizontal angle of view of the image capturing unit.

3. The image capturing apparatus according to claim 1, wherein the determination unit determines the visible range restriction information based on edges in the tilt direction of the movable range restriction information and a maximum vertical angle of view of the image capturing unit.

4. The image capturing apparatus according to claim 1, wherein the image capturing apparatus and the external device communicate with each other according to a predetermined protocol.

5. The image capturing apparatus according to claim 4, wherein the predetermined protocol is an ONVIF protocol.

6. A method of controlling an image capturing apparatus connected to a network, the image capturing apparatus having an image capturing unit capable of changing a capturing region in a pan direction and a tilt direction and capable of changing a size of an angle of view, the method comprising:

controlling, based on a visible range restriction information, the capturing region and the size of the angle of view of the image capturing unit so that the image capturing unit does not capture outside of a region defined by the visible range restriction information, wherein the visible range restriction information defines the region using an edge of the angle of view as a criterion;

receiving, from an external device, a movable range setting command indicating movable range restriction information defining a movable range of the pan direction and the tilt direction of the image capturing unit, wherein the movable range restriction information defines the movable range using a center of the angle of view as a criterion; and determining, in a case where the movable range setting command is received, visible range restriction information from the movable range restriction information indicated by the received movable range setting command and a maximum angle of view of the image capturing unit, wherein the controlled is performed, in the case where the movable range setting command is received, based on the determined visible range restriction information, on the capturing region and the size of the angle of view of the image capturing unit.

7. The method according to claim 6, wherein the visible range restriction information is determined based on edges in the pan direction of the movable range restriction information and a maximum horizontal angle of view of the image capturing unit.

8. The method according to claim 6, wherein the visible range restriction information is determined based on edges in the tilt direction of the movable range restriction information and a maximum vertical angle of view of the image capturing unit.

9. The method according to claim 6, wherein the image capturing apparatus and the external device communicate with each other according to a predetermined protocol.

10. The image capturing apparatus according to claim 9, wherein the predetermined protocol is an ONVIF protocol.

11. A non-transitory computer-readable storage medium storing a computer program for a method of controlling an angle of view of an image capturing apparatus, the image capturing apparatus having an image capturing unit capable of changing a capturing region in a pan direction and a tilt direction and capable of changing a size of an angle of view, the method comprising:

controlling, based on a visible range restriction information, the capturing region and the size of the angle of view of the image capturing unit so that the image capturing unit does not capture outside of a region defined by the visible range restriction information, wherein the visible range restriction information defines the region using an edge of the angle of view as a criterion;

receiving, from an external device, a movable range setting command indicating movable range restriction information defining a movable range of the pan direction and the tilt direction of the image capturing unit, wherein the movable range restriction information defines the movable range using a center of the angle of view as a criterion; and determining, in a case where the movable range setting command is received, visible range restriction information from the movable range restriction information indicated by the received movable range setting command and a maximum angle of view of the image capturing unit, wherein the controlled is performed, in the case where the movable range setting command is received, based on the determined visible range restriction information, on the capturing region and the size of the angle of view of the image capturing unit.

12. The storage medium according to claim 11, wherein the visible range restriction information is determined based on edges in the pan direction of the movable range restriction information and a maximum horizontal angle of view of the image capturing unit.

13. The storage medium according to claim 11, wherein the visible range restriction information is determined based on edges in the tilt direction of the movable range restriction information and a maximum vertical angle of view of the image capturing unit.

14. The storage medium according to claim 11, wherein the image capturing apparatus and the external device communicate with each other according to a predetermined protocol.

15. The image capturing apparatus according to claim 14, wherein the predetermined protocol is an ONVIF protocol.

* * * * *